(12) United States Patent
Kamimura et al.

(10) Patent No.: US 6,736,541 B2
(45) Date of Patent: May 18, 2004

(54) LINEAR MOTION GUIDE UNIT WITH MEANS FOR KEEPING CAGE AGAINST WANDERING

(75) Inventors: Akihiko Kamimura, Kanagawa-ken (JP); Takaaki Tsuboi, Kanagawa-ken (JP); Kouji Obara, Kanagawa-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 0 days.

(21) Appl. No.: 10/302,853

(22) Filed: Nov. 25, 2002

(65) Prior Publication Data

US 2003/0108256 A1 Jun. 12, 2003

(30) Foreign Application Priority Data

Dec. 11, 2001 (JP) ........................................ 2001-377292

(51) Int. Cl.[7] ................................................. F16C 29/04
(52) U.S. Cl. ........................................... 384/47; 384/51
(58) Field of Search ............................... 384/47, 51, 56, 384/50, 59

(56) References Cited

FOREIGN PATENT DOCUMENTS

| JP | 11-108056 | 4/1999 |
|---|---|---|
| JP | 11-315831 | 12/2000 |
| JP | 11-315832 | 8/2001 |

*Primary Examiner*—Leonard A Footland
(74) *Attorney, Agent, or Firm*—Browdy and Neimark, P.L.L.C.

(57) ABSTRACT

In a linear motion guide unit in which a rack-and-pinion arrangement is interposed between paired guide rail members to keep a cage against falling off from the guide rail members, the rack is made reduced in size in depth direction to fit well in even a gutter cut small in depth in the guide rail member. The rack is made up of successive teeth mating with the pinion, and side walls to join the teeth together with one another. The side walls of the rack are rendered thickened sidewise with depth while sidewise opposing surfaces defining a gutter cut in the guide rail also lean away one another with depth in a way conforming to the side walls of the rack, so that the rack can be fastened in the gutter by virtue of face-to-face engagement of the side walls with the associated surfaces in the gutter.

15 Claims, 8 Drawing Sheets

(a)

(b)

(c)

(a)

(b)

(c)

(a)

(b)

(c)

(a)

(b)

(c)

LINEAR MOTION GUIDE UNIT WITH MEANS FOR KEEPING CAGE AGAINST WANDERING

BACKGROUND OF THE INVENTION

1. Field of the Invention

The present invention relates generally to a linear motion guide unit adapted for use in a variety of machinery such as semiconductor manufacturing machines, precision measuring instruments, precision inspection equipment, precision assembly machines or the like and, more particularly, to a linear motion guide unit that is provided therein with means for keeping a cage against wandering.

2. Description of the Prior Art

In recent years, linear motion guide units of the type hereinafter referred to as "finite linear motion guide unit" because of their construction where rolling elements are allowed to roll over only a definite travel instead of rolling through a recirculating circuit have been used extensively in diverse fields of machinery such as semiconductor manufacturing machines to guide a part in a linear way relatively to any counterpart. Correspondingly, the finite linear motion guide units of the sort recited just above are seeing growing demands for high speed operation and high acceleration/deceleration, with even made slim or compact in construction. At the same time the advanced machinery expects the finite linear motion guide units to be operated with high precision and low-frictional resistance, and so on. Solving the issues stated earlier is needed for further development of the linear motion guide units.

Typically, most prior finite linear motion guide units of the type recited earlier have a mechanism for keeping a cage against wandering, which is a rack-and-pinion arrangement having, for example a rack 41 shown in FIG. 15. The rack 41 lies in a gutter for relief cut in a raceway groove of a guide rail member in a longitudinal direction thereof, with its tooth bottom part 44 coming into face-to-face contact with a gutter bottom 45. The rack 41 is slotted at 42 in such a fashion that the rack material remains on the tooth bottom part 44 between the slots 42 in the form of teeth 46 that are arranged successively in the lengthwise direction of the rack 41 at a pitch preselected to mesh with an associated pinion. Moreover, tooth tips 43 of the teeth 46 are made flat, for example as shown at 47. With the rack 41 constructed as stated earlier, the tooth bottom part 46 can contribute to keeping securely the teeth 46 at their desired positions. Nevertheless, modern tiny linear motion guide unit of the sort recited here can not frequently afford any space to allow the tooth bottom part 44 to have a thickness enough to hold up the teeth.

In Japanese Patent Laid-Open No. 108056/1999, there is disclosed a finite linear motion guide unit of the type recited earlier, which has means for keeping a cage or retainer against wandering to help control certainly the travel of finite guide rail members. The cylindrical rollers held in the cage are placed for rolling between confronting raceway grooves formed on the guide rail members. The cage has supported a pinion for rotation, which comes in mesh with a rack of gear teeth held in a gutter for relief. With the finite linear motion guide unit recited earlier, the rack lies in the gutter for relief cut lengthwise in the raceway groove formed on the guide rail member. The teeth on the rack are made recessed to avoid any interference with the cylindrical rollers. This construction allows the rack of gear teeth to be made in a module large in size, thus increasing the strength in mesh with the pinion thereby to keep the cage against wandering with respect to the associated guide rail members. Thus, the rack-and-pinion mechanism recited just above may be instrumental in keeping the cage against wandering relatively to the guide rail members.

The present assignee has already filed a senior pending Patent Application No. 2001-216235 in Japan relating a finite linear motion guide unit of the sort discussed here in which an earlier developed rack-and-pinion arrangement can serve effective function for keeping the cage against wandering. The finite linear motion guide unit discussed in the earlier pending application, although not shown here, is made shrunken in size and constructed such that a pinion coming into mesh with a rack is installed for rotation in a pinion holder fit in a cage. Especially, the senior application discloses means for keeping the cage against wandering, in which the pinion is held in a pinion chamber made in the pinion holder. The pinion is comprised of a disc having the teeth that are positioned circumferentially at regular intervals around the disc to form tooth spaces or slots each separating any two adjacent teeth, and a shaft carried in the pinion chamber for rotation to provide an axis about which the disc rotates. Moreover, the teeth formed around the disc are each made up of a dedendum part extending radially outwardly out of a curved periphery of the disc, and an addendum part integral with the dedendum part and made in a semicircular configuration. With the finite linear motion guide unit disclosed in the senior pending application, the rack lying lengthwise in the gutter for relief cut in the raceway groove on the guide rail member is made integral with the guide rail member by a molding process in which a powder of metal is formed with a metal injection molding, followed by being subjected to sintering.

With the every prior finite linear motion guide units of the sort discussed here, the rack is made with slots successive in the longitudinal direction thereof with the same pitch as the circular pitch of teeth on the mating pinion. The slots on the rack are each defined between two adjacent projections or teeth integral with a tooth bottom part and also designed to have a circular configuration somewhat larger in radius than the semicircular configuration of the addendum of the pinion tooth, thereby allowing the pinion making certain of sequential mating with the teeth on the pinion to smoothly come into successive mesh with the mating teeth of the rack. Moreover, the prior finite linear motion guide units of the sorts stated earlier, as the rack and the pinion are made relatively complicated in their tooth profile, are apt to encounter large sliding resistance and intermeshing resistance, and also very tough to shrink the guide unit itself down to tiny size in construction.

In most prior finite linear motion guide units of the sort discussed here, the guide rail member is commonly made on sides thereof with bolt holes lengthwise at preselected intervals, which are used to fasten the guide rail member to other object including a table, basement, sliding pedestal, machine bed and so on. When the linear motion guide units must meet an anticipated design demand to shrink them down as tiny as possible in size, nevertheless, the gutter for relief formed in the raceway groove on the guide rail member to fit the rack therein, just as in the conventional constructions, has to be inevitably restricted in depth to the extent where the gutter is allowed to extend around the fastening bolts. This makes the gutter for relief less in depth, thus making it tough to lay the conventional rack in the gutter.

SUMMARY OF THE INVENTION

The present invention, therefore, has as its primary object to overcome the major problems discussed earlier in the finite linear motion guide units of the sort stated earlier, and in particular to provide a finite linear motion guide unit with means for keeping a cage against any wandering, in which a rack has lengthwise side walls opposing widthwise across successive rack teeth to join the teeth together with one another so as to make it possible to keep the teeth between them at a preselected pitch even when any tooth bottom part does not necessarily remain in the rack. The present invention provides the finite linear motion guide unit with means for keeping a cage against wander, in which the tooth bottom part of the rack, if any, can be made as thin as possible to render the rack as slim as possible in depth. According to the present invention especially, the rack used in the means for keeping the cage against wandering is envisaged to fit snugly in the gutter for relief cut in the raceway groove to a depth where the rack is allowed to lie in the gutter for relief without any interference with bolt holes used to fasten a guide rail member to other object including a table, machine bed, sliding pedestal, and so on, and also the rack is held securely in the gutter by virtue of the side walls, which can make it possible to construct the linear motion guide unit itself as tiny as possible in size.

The present invention is concerned with a linear motion guide unit, comprising a pair of guide rail members that are arranged movable relatively to one another and have confronting raceway grooves on their lengthwise sides, one to each side, a cage retaining more than one rolling element allowed to run through in a raceway defined between the raceway grooves on the guide rail members, and means for keeping the cage against wandering; wherein the means for keeping the cage against wandering is comprised of racks lying in gutters cut in the raceway grooves, one to each raceway groove, in opposition to one another, and a pinion having teeth mating with the opposing racks and installed in the cage for rotation; and wherein the rack is composed of successive teeth spaced apart from each other at preselected intervals to allow the teeth to mesh with the pinion, and side walls extending in longitudinal direction on sidewise opposite sides of the teeth, one to each side, to connect the successive teeth together with one another.

In an aspect of the present invention, there is provided a linear motion guide unit in which the side walls of the rack come in engagement with surfaces defining the gutter cut in the raceway groove of the guide rail member thereby to keep the rack within the gutter in the raceway groove of the guide rail member. In another aspect of the present invention, a linear motion guide unit is disclosed in which the surfaces defining the gutter cut in the guide rail member lean away one another with depth while the side walls of the rack are rendered thickened sidewise with depth in a way conforming to the surfaces in the gutter. In another aspect of the present invention, a linear motion guide unit is disclosed in which the gutter in the guide rail member is cut in a fashion getting extended sidewise in the depths of the gutter to form a rectangular shape in traverse cross section, with any one side of the surfaces being set back in sidewise distance either identical with or different from another side, and the side walls of the rack are made thickened in a way conforming to the surfaces in the gutter. In another aspect of the present invention, a linear motion guide unit is disclosed in which the gutter is cut in the guide rail member to have the surfaces made concaved to bulge sidewise outwardly in the depths of the gutter, and the rack has the side walls each of which extends over an overall depth of the teeth and gets convex sidewise outwardly so as to conform to the associated surface of the gutter. In a further another aspect of the present invention, a linear motion guide unit is disclosed in which the gutter cut in the guide rail member has the surfaces made concaved sidewise outwardly at only deep area next to a bottom of the gutter, and the rack has side walls that are made thick at only limited area lower in the depth of the teeth so as to conform to the associated surface of the gutter.

In another aspect of the present invention, there is provided a linear motion guide unit in which the rack consists of only the teeth and the side walls integral with the teeth. As an alternative, a linear motion guide unit is provided in which the rack is made up of the teeth, the side walls and a tooth bottom part thin in thickness made integral with the teeth and the side walls.

In another aspect of the present invention, there is provided a linear motion guide unit in which the rack is made of either a resinous material or a low-temperature fusible metal, which is poured into the gutter of the guide rail member, then finished by removing partially material from the poured material with machining operations. As an alternative, a linear motion guide unit is disclosed in which the rack is kept in the gutter in the guide rail member, with the side walls being either close fit or fastened with adhesives in the gutter.

In another aspect of the present invention, there is provided a linear motion guide unit in which the side walls of the rack are made in a way coming into engagement with the surfaces defining the gutter cut in the guide rail member. In another aspect of the present invention, a linear motion guide unit is provided in which the teeth of the rack are rounded at their tooth tips. In a further another aspect of the present invention, a linear motion guide unit is provided in which the rack is made with a round slot between any two adjacent teeth, and the pinion has the teeth of round rods that extend radially outwardly and get spherical at their tooth tips so as to mesh well with the round slot of the rack. In another aspect of the present invention, a linear motion guide unit is provided in which the teeth of the rack are rounded at their tooth tips.

In a further another aspect of the present invention, there is provided a linear motion guide unit in which the rack is suitable for the use in a tiny linear motion guide unit where bolt holes used to fasten an object including a table, bed, base, sliding pedestal, machine bed, and so on to the guide rail member have to be in as close as possible to the bottom of the gutter on which the rack is laid.

With the linear motion guide unit constructed as stated earlier, the rack in the pinion-and-rack mechanism performing the duty of means for keeping the cage against wandering can shrink in size by constituting with at least only the successive teeth and the side walls. The tooth bottom part between any two adjacent teeth of the rack, if any, can be rendered in the form of film that has little thickness. According to the present invention, whether there is the tooth bottom part between any two adjoining teeth or not, the successive teeth are securely joined together with one another by virtue of only the side walls to be positioned firmly at preselected intervals that allow the teeth to mesh with the pinion. Thus, even though the gutter cut in the raceway groove on the guide rail member has to be restricted shallow in depth because of the bolt holes used to fasten the guide rail member to any other object, the rack can lie snugly, firmly in even the gutter less in depth and, therefore, suits the tiny guide rail member.

As the rack constructed as stated earlier is adaptable for the rack in the rack-and-pinion arrangement that may serve as the means for preventing the cage from any wandering in the linear motion guide unit disclosed in the senior pending Japanese Patent Application No. 2001-216235, the finite linear motion guide unit with rack according to the present invention makes it possible to use the pinion in the pinion-and-rack arrangement just as it is. Moreover, the finite linear motion guide unit with the rack of the present invention is applicable well for a wide ranges of sizes, from very small to very large guide rail members, also helping make certain of the accurate linear travel of the moving part such as a table, meeting demands for high speed operation and high acceleration/deceleration of the moving part or the table, with even made slim or compact in construction, and at the same time helping serve useful functions such as low-frictional sliding resistance, and so on.

The rack incorporated in the finite linear motion guide unit of the present invention, because the successive teeth lying in lengthwise direction are joined together with at least only the side walls, can be made reduced in depth to allow the rack to fit snugly, firmly in even the gutter that is cut shallow in the raceway groove of the guide rail member lest the gutter comes into no interference with the bolt holes used to fasten a guide rail member to other object. With the rack in the present invention, moreover, the successive teeth can be connected to one another with only the side walls so as to take on the function of the rack even though the tooth bottom part has little or no thickness.

Accordingly, the linear motion guide unit with the rack constructed as stated earlier is suitable for the small instruments including semiconductor manufacturing machines, precision machines, and so on. The pinion-and-rack arrangement constituting the means for keeping the cage against any wandering may be installed in the cage easily with accuracy by only close-fit of the arrangement in an aperture cut in the cage. Moreover, the linear motion guide unit of the present invention is preferable for the small machines, and also helps make certain of the accurate travel of the moving part such as a table mounted on any guide rail member, meeting demands for high speed operation and high acceleration/ deceleration of the moving part or the table, with even made slim or compact in construction. At the same time the present invention helps serve useful functions such as low-frictional sliding resistance, and so on anticipated for linear motion guide unit of the sort discussed here.

Other aspects, objects and advantages of the present invention can be obtained from a study of the drawings, the disclosure and the appended claims.

BRIEF DESCRIPTION OF THE DRAWINGS

in FIG. 5(a) the rack is depicted on top plan view; in FIG. 5(b) the rack is illustrated on front elevation view as it has no tooth bottom part; and in FIG. 5(c) the rack is illustrated on front elevation view as it has a tooth bottom part:

in FIG. 7(a) the rack is depicted on top plan view; in FIG. 7(b) the rack is illustrated on front elevation view as it has no tooth bottom part; and in FIG. 7(c) the rack is illustrated on front elevation view as it has a tooth bottom part:

in FIG. 9(a) the rack is depicted on top plan view; in FIG. 9(b) the rack is illustrated on front elevation view as it has no tooth bottom part; and in FIG. 9(c) the rack is illustrated on front elevation view as it has a tooth bottom part:

in FIG. 11(a) the rack is depicted on top plan view; in FIG. 11(b) the rack is illustrated on front elevation view as it has no tooth bottom part; and in FIG. 11(c) the rack is illustrated on front elevation view as it has a tooth bottom part:

DETAILED DESCRIPTION OF THE PREFERRED EMBODIMENTS

Figure 1:
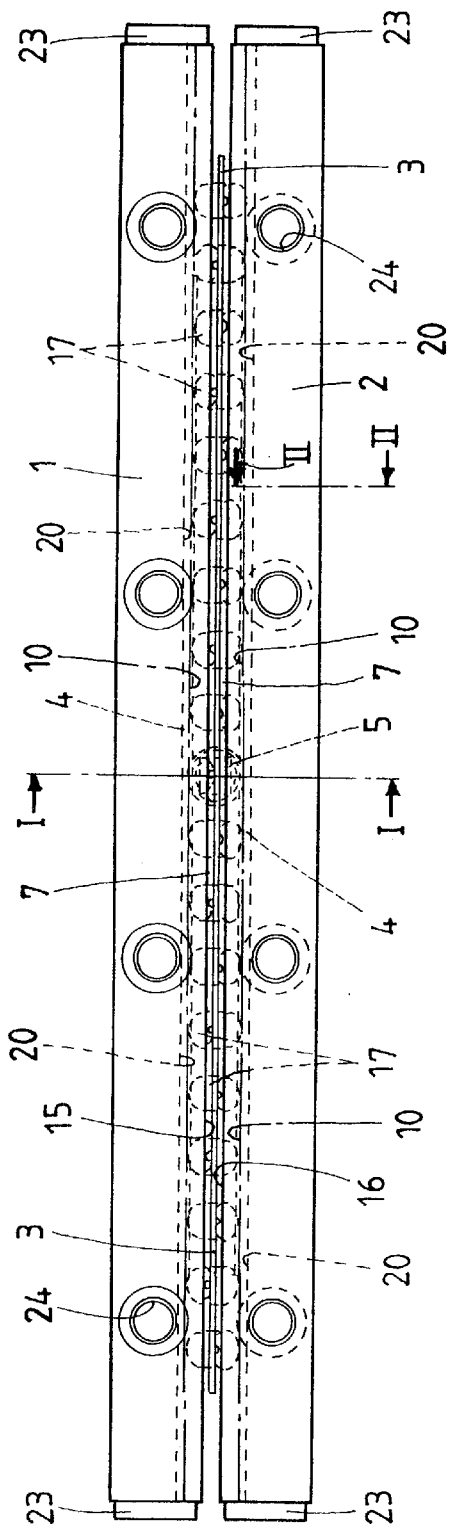
FIG. 1 is a front elevation showing a preferred embodiment of a finite linear motion guide unit according to the present invention.

Embodiments of a finite linear motion guide unit with means for keeping a cage against wandering according to the present invention will be described in detail with reference to the accompanying drawings. The finite linear motion guide unit discussed later is to make a refinement to the rack used in the linear motion guide unit of the sort disclosed in the senior pending Japanese Patent Application No. 2001-216235 of common assignment. The finite linear motion guide unit of the present invention, accordingly, has about the same construction in basic aspect as that disclosed in the senior pending application stated earlier, and in particular is marked by a refined rack constituting the rack-and-pinion arrangement that can work as the means for keeping the cage 3 against wandering off from the guide rail members 1, 2. Most components including the pinion 5 other than the rack 4 may be equally applicable to the finite linear motion guide unit of the present invention. What will be mainly discussed here will be largely confined to the features of the rack 4 while other most components such as the pinion 5 and so on in the finite linear motion guide unit will be explained just briefly.

The finite linear motion guide unit of the present invention is envisaged to render it suitable for use in tiny guide rail members 1, 2 in which a gutter 20 for relief cut in a raceway groove 10 on any one of the guide rail members 1, 2 to fit a rack 4 therein has to be situated as nearer as possible to any bolt holes 24 bored in the guide rail member 1 or 2 to fasten the guide rail member 1 or 2 to other object including a table, machine bed, sliding pedestal, and so on.

Figure 2:
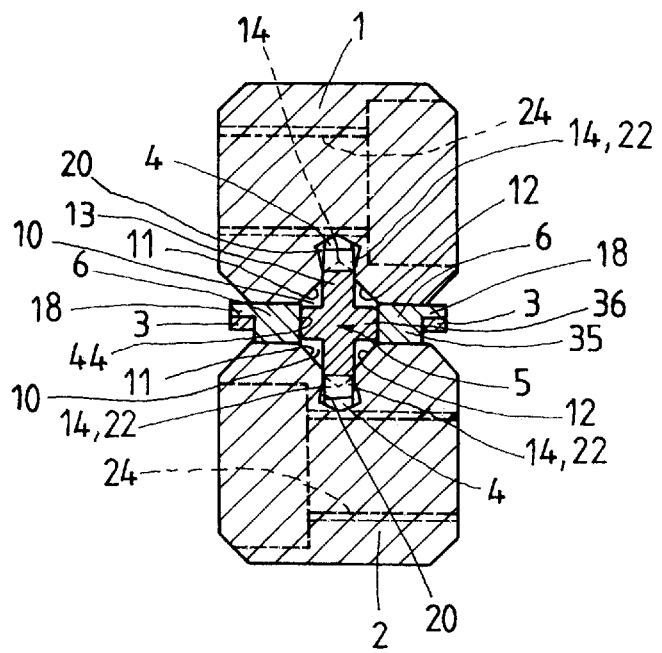
FIG. 2 is a traverse cross section taken along the plane lying on the line I—I of FIG. 1 to illustrate intermeshing of a pinion with a rack in the finite linear motion guide unit shown in FIG. 1.

The finite linear motion guide unit of the present invention, as shown in FIGS. 1 and 2, is comprised of at least one pair of guide rail members 1, 2 arranged in a way movable lengthwise relatively of one another and having raceway grooves 10 on their lengthwise surfaces 15, 16 confronting mutually one another, one to each surface, more than one rolling element 17 disposed in a raceway 7 defined between the raceway grooves 10 on the guide rail members 1 and 2, a sheet cage 3 holding the rolling elements 17 therein, and a rack-and-pinion mechanism serving as means for keeping the cage 3 against wandering off from the guide rail members 1, 2. The rack-and-pinion mechanism is made up of the racks 4 lying in the gutters 20 cut in the raceway grooves 10, one to each gutter, and the pinion 5 carried for rotation in the cage 3 and having teeth 22 that mesh with the associated opposing racks 4.

With the embodiment discussed now, the raceway grooves 10 are made on the confronting surfaces 15, 16 of the paired guide rail members 1, 2, one to each surface, to form a raceway of rectangular cross section between the confronting surfaces 15, 16. With the raceway constructed as stated just earlier, more than one rolling element 17 of a cylindrical roller can be interposed snugly between the opposing raceway grooves 10 for free rolling along the raceway. Thus, the guide rail members 1, 2 are allowed to move with respect to each other along their longitudinal direction by virtue of the rollers 17. Moreover, the guide rail members 1, 2 are made with bolt holes 24 such as counterbores, threaded holes, and so on lengthwise at preselected intervals, and combined together in a relation that they are turned around over 180 degrees with respect to each other, so that any one of the guide rail members 1, 2 is fastened to the stationary side such as a machine bed, not shown, while another of the guide rail members 1, 2 is connected to the moving side such as a table, not shown. According to the finite linear motion guide unit constructed as stated above, thus, the moving part such as a table, and so on fastened to any one of the guide rail members 1, 2 is allowed to travel in a linear direction relatively to the stationary part such as a machine bed, and so on fastened with bolts to the counterpart of the guide rail members 1, 2.

Figure 3:
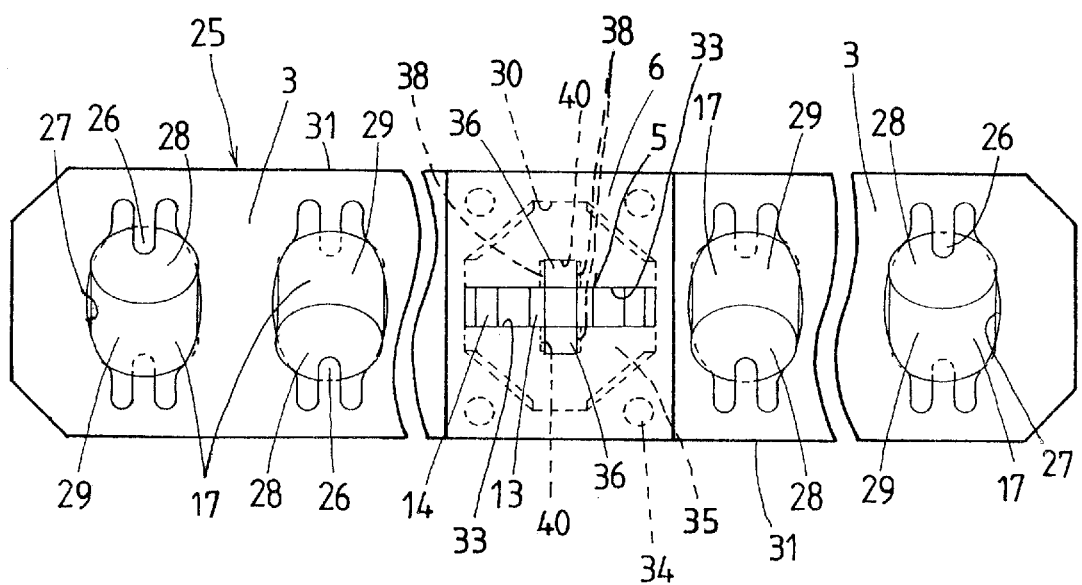
FIG. 3 is a top plan view, partly broken away, showing a cage assembly having incorporated with rolling elements and a pinion to be placed in the finite linear motion guide unit of FIG. 1.

With the finite linear motion guide unit discussed here, as seen in FIG. 1, the guide rail members 1, 2 are each provided at forward and aft ends thereof with threaded holes, one to each end, into each of which fits an end screw 23 having a stopper head to keep the cage 3 from escape out of the associated guide rail member 1, 2. Referring to FIGS. 1 to 3, the finite linear motion guide unit of the present invention mainly has the cage 3 of flat material holding therein more than one rolling element of cylindrical roller 17 arranged in the raceway 7 that is defined between the confronting raceway grooves 10 of the paired guide rail members 1, 2, the racks 4 lying in opposition to one another across the raceway in the gutters 20 for relief cut in the confronting raceway grooves 10, the pinion 5 having teeth 14 mating with the associated racks 4 and supported on the cage 3 for rotation, and a pinion holder 6 fit in an aperture 30 formed in the cage 3 to keep correctly the pinion 5 in a pinion chamber 38 therein for free rotation. Moreover, the racks 4 lying in the gutters 9 for relief cut in the raceway grooves 10 of the guide rail members 1, 2 may be formed in a diversity of constructions.

The pinion 5, as illustrated in FIGS. 2 and 3, has a disc 13 and a pinion shaft 36 extending axially from the opposite sides of the disc 13 to provide a pinion-shaft axis about which the disc 13 rotates. In detail, the pinion 5 is comprised of the disc 13 in which the successive teeth 14 are positioned at a circular regular pitch around the curved periphery of the disc 13 to form slots each separating any two adjacent teeth 14, and the pinion shaft 36 carried in the pinion chamber 38 for rotation to provide an axis about which the disc 13 rotates. Each of the successive teeth 14 on the pinion 5 has a specially designed tooth profile instead of any conventional tooth profile of involutes curve. For example, the teeth 14 spaced apart from each other around the disc 13 of a desired diameter are designed to have a top land made in a semicircular profile of a preselected diameter. The successive teeth 14 on the pinion 5 are each made up of a dedendum part extending radially outwardly out of the curved periphery of the disc 13, and an addendum part integral with the dedendum part having the center of curvature, which is placed radially outwardly out of the outer periphery of the disc 13. Moreover, the pinion shaft 36 is planted integrally in the center of the disc 13 in the direction perpendicular to the plane of the discs 13. The teeth 14 on the pinion 5 designed in the specific tooth profile as stated earlier are effective to render less the resistance that would be encountered when coming in mating with the teeth 22 on the rack 4, helping make the tooth thickness large, thereby contributing to increasing the strength and stiffness of the teeth and also allowing the tooth to have higher dedendum of gear-tooth so as to make certain of the provision of the tooth form in which there is less possibility of disengagement out of mating with the associated tooth on the rack.

Referring to FIG. 3, there is shown in detail a cage assembly 25 to be interposed between the confronting sides 15, 16 of the guide rail members 1, 2. The cage assembly 25 is mainly comprised of the cage 3 to hold therein the cylindrical rollers 8 for rotation, the pinion holder 6 attached to the cage 3, and the pinion 5 installed in the pinion holder 6. The cage 3 is provided with an aperture 30 at the lengthwise intermediate area thereof, in which a raised thick portion 35 of the pinion holder 6 fits closely, while the pinion holder 6 is made therein with the pinion chamber 38 where the pinion shaft 36 of the pinion 5 is carried for rotation. Thus, the pinion 5 is held in the cage 3 through the pinion holder 6, with the disc 13 of the pinion 5 being accommodated in a pinion area 33 in the pinion holder 6. More than one pin 34 made on a flange portion 18 of the pinion holder 6 fits in a hole of the cage 3 to support and locate the pinion holder 6 on the cage 3, then followed by caulking the opposite ends of the pin 34 by any suitable tool to fasten firmly the pinion holder 6 on the cage 3. To keep the pinion 5 for rotation in the cage 3 through the pinion holder 6, the pinion shaft 36 of the pinion 5 is forced into bearing areas 40 of the pinion chamber 38 in such a way the disc 13 may fit in the pinion area 33 of the pinion holder 6 secured on the cage 3.

The cage 3, as shown in FIG. 3, is made of a rectangular sheet extending in the direction along the guide rail members 1, 2, which is made with a series of pockets 27 that are arranged at preselected intervals in the longitudinal direction of the cage 3. In the pockets 27 there are provided fingers 26 to retain the rolling elements 17 in the pockets 27, one to each pocket. The cage 3 is also made at roughly intermediate area thereof with the aperture 30 in which the pinion holder 6 fits closely. The pinion holder 6 has a thick portion 35 raised above any one side thereof so as to fit in the aperture 30 in the cage 3, and the flange portion 18 surrounding the thick portion 35 so as to come in abutment against any flank of the cage 3 to join the pinion holder 6 to the cage 3. The pinion 5 is carried in the pinion holder 6 for free rotation. The rolling elements 17 held in the cage 3 are cylindrical rollers of square cross section, which are arranged in linear direction with their own axes intersecting alternately one another. The aperture 30 made in the cage 3 roughly midway between lengthwise ends of the cage 3 is larger in size than the pocket 27 in which the rolling element 17 is accommodated. The aperture 30, for example is formed in an octagonal shape that is derived by leaving four corners of a quadrilateral having any two opposing sides parallel with lengthwise edges of the cage 3. At four corner areas remaining in the cage 3 to define the aperture 30 of octagonal shape, there are made bolt holes in which the pins 34 on the flange portion 18 of the pinion holder 6 fit closely.

The pinion holder 6 includes the raised thick portion 35 that fits in and conforms to the aperture 30 in the cage 3, and the flange portion 18 extending around the raised portion 35, which is brought into face-to-face engagement with any one side of the cage 3 to be held in place on the cage 3 with the pins 34. Thus, the pinion holder 6 has the thick portion 35 of roughly octagonal configuration in plan view, which is raised above any one side, for example the lower side of the rectangular sheet. The thick portion 35 is made recessed at a central area thereof to provide the pinion chamber 38 that includes bearing areas 40 to carry the pinion shaft 36 of the pinion 5 for rotation, and a pinion area 33 of rectangular cross section extending lengthwise of the guide rail member, in which the pinion 5 is accommodated with the teeth 14 thereof being allowed to circulate around the pinion shaft 36. The bearing areas 40 lie midway between forward and aft ends of the pinion area 33 on opposite sides thereof and extend perpendicularly to the pinion area 33. That is, the bearing areas 40 in the pinion chamber 38 are formed to define holes of rectangular cross section intersecting the pinion area 33 at right angle. At four corner areas of the pinion holder 6 there are provided the pins 34 raised above the same side as the thick portion 35 to fit in holes perforated in the cage 3.

The finite linear motion guide unit of the present invention features various construction of the rack 4 as especially shown in FIGS. 4 to 11. The racks 4 are laid in the gutters 20 for relief cut in the raceway grooves 10 of the guide rail members 1, 2, one to each groove. The rack 4 in the present invention is characterized by the combination of teeth 22 arranged in a way spaced apart from one another at preselected intervals to mesh with the teeth on the pinion 5 and side walls 8 extending lengthwise of the rack 4 with flanking sidewise opposite ends of the teeth 22 to connect the successive teeth 22 with each other. The rack 4 in the present invention is also marked by the function in which the side walls 8 thereof come in face-to-face engagement with their associated inside surface in the gutter 20 when the rack 4 fits in the gutter 20, thereby helping keep securely the rack 4 in the gutter 20. The rack 4 may be formed in any of the diverse constructions as shown in FIGS. 4 to 11.

Figure 4:
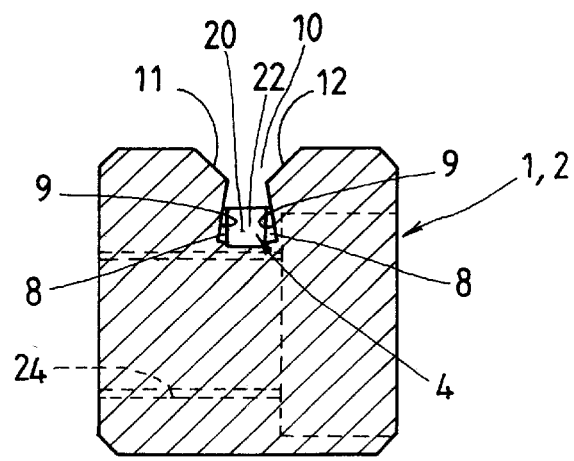
FIG. 4 is a cross section showing a preferred embodiment of any one of guide rail members in the finite linear motion guide unit of FIG. 1, the view being taken along the plane lying on the line II—II of that figure.
Figure 5:
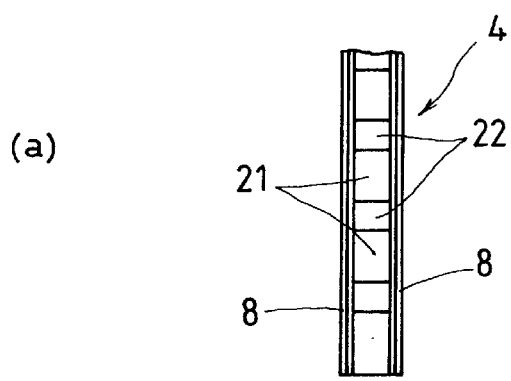
FIGS. 5(a), 5(b) and 5(c) illustrate a preferred embodiment of a rack to be laid in a gutter for relief cut in a raceway groove on the guide rail member of FIG. 4.
Figure 5:
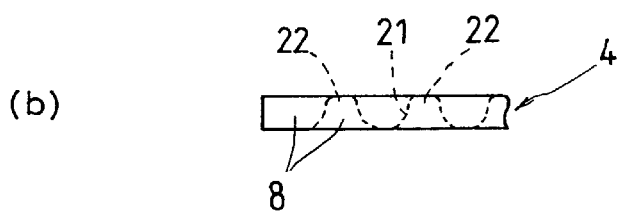
Figure 5:
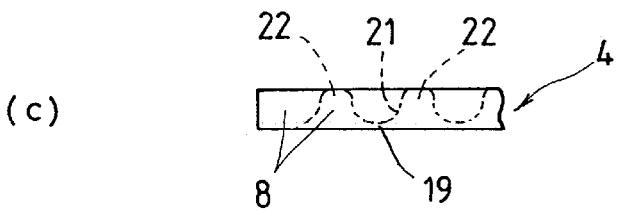

Referring first to FIGS. 4 and 5, there is shown a first embodiment of the rack 4. The gutter 20 for relief cut in the guide rail member 1, 2 is defined with inside surfaces 9 that lean away one another with depth while the side walls 8 of the rack 4, as illustrated in FIGS. 4 and 5(a), are laid to form a dovetail-shape in traverse cross section, which is getting widened sidewise with depth in a way conforming to the inside surfaces 9 in the gutter 20. The rack 4, moreover, is constituted with only the successive teeth 22 connected integrally to the side walls 8 lying in sidewise opposition to each other across the teeth. With the rack construction stated just earlier and shown in FIGS. 5(a) and (b), the successive teeth 22 are kept with only the side walls 8 in a way spaced apart from one another at preselected intervals to mesh well with the pinion 5. It is to be noted that the side walls 8 play a role in keeping the rack 4 against escape out of the associated gutter 20 for relief after the rack 4 has been once fit in the gutter 20. As a result, the rack 4 constructed as shown in FIG. 5(b) can serve well its function despite of no tooth bottom part remaining between any two adjacent teeth 22. In other words, the rack 4 is made bottomless or open at 21 between any two adjacent teeth 22. The construction of the gutter 20 for relief, in which the inside surfaces 9 lean away from one another as stated earlier helps ensure as much raceway surfaces 11, 12 as the conventional finite linear motion guide units at the raceway groove 10.

The rack 4, as shown in FIG. 5(c), may be made in alternative construction where a tooth bottom part 19 very thin in thickness is disposed integrally with both the teeth 22 and the side walls 8. With the alternative construction stated just earlier, the tooth bottom part 19 could help the side walls 8 better keep the successive teeth 22 at preselected intervals. Although but the rack 4 of the alternative construction includes the thin tooth bottom part 19 formed integrally with the teeth 22 and the side walls 8, the tooth bottom part 19 in itself and of itself might unnecessarily have a strength enough to connect the successive teeth 22 with one another against any expected load, because the side walls 8 connecting the teeth 22 with each other are considered there is no question of the strength to keep the teeth 22 at their desired intervals. As for the pinion 5, the disclosure in the senior pending Japanese Patent Application No. 2001-216235 will be incorporated here by reference.

Figure 6:
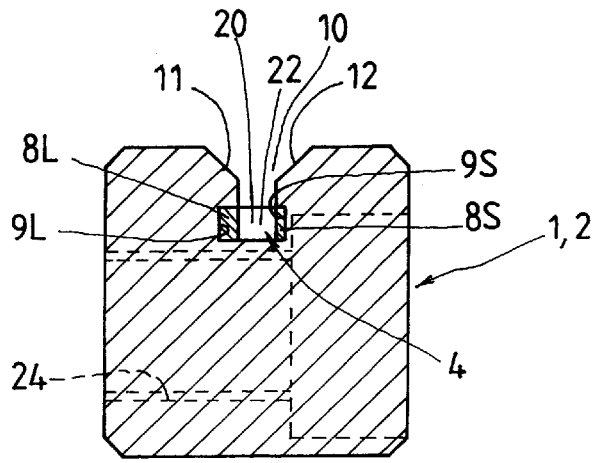
FIG. 6 is a cross section showing a second embodiment of any one of guide rail members in the finite linear motion guide unit of FIG. 1, the view being taken along an area corresponding to the plane lying on the line II—II of FIG. 1.
Figure 7:
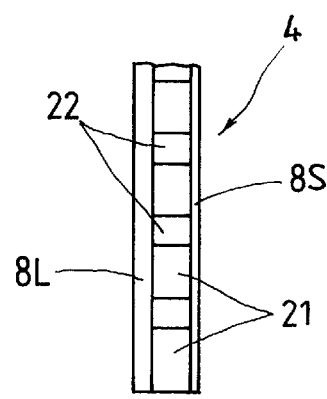
FIGS. 7(a), 7(b) and 7(c) illustrate a second embodiment of the rack to be laid in a gutter for relief cut in a raceway groove on the guide rail member of FIG. 6.
Figure 7:
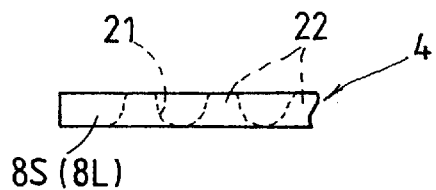
Figure 7:
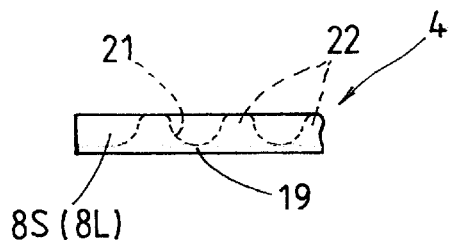

Referring next to FIGS. 6 and 7, there is shown the second embodiment of the rack 4. The gutter 20 for relief where the rack 4 of the second embodiment fit therein is cut in a fashion getting extended sidewise in the depths of the gutter 20 to form a rectangular shape in traverse cross section, with any one side 9L of inside surfaces being set back in sidewise distance more than another side 9S. To comply with the gutter 20 asymmetry sidewise in traverse cross section, the rack 4 is designed in a way any one side wall 8L is made larger in sidewise thickness than another side wall 8S. Namely, the rack 4 in FIGS. 7(a) and 7(b) is constructed such that the any one-side wall 8L is deliberately rendered thicker than the counterpart 8S. The gutter 20 for relief cut in the guide rail members 1, 2 is defined with the inside surfaces 9L, 9S that are far away in widthwise direction from one another in the depths of the gutter 20 to form any rectangular or quadrilateral shape in traverse cross section as shown in FIG. 6, whether asymmetry or symmetry sidewise with respect to the widthwise intermediate plane of the gutter 20. That is, the inside surface 9L of the gutter 20 is set back sidewise to provide a relatively large space of quadrilateral shape in traverse cross section and the corresponding side wall 8L of the rack 4 is made large in thickness to have a large quadrilateral shape in traverse cross section. In contrast, another inside surface 9S of the gutter 20 is set back sidewise to provide a relatively small space of quadrilateral shape in traverse cross section and the corresponding side wall 8S of the rack 4 is made thin in thickness to have a slim quadrilateral shape in traverse cross section. The rack 4, as shown in FIG. 7(b), is constituted with only the successive teeth 22 connected integrally to the side walls 8S, 8L lying in sidewise opposition to each other across the teeth. The rack 4, as shown in FIG. 7(c), may be made in alternative construction where a tooth bottom part 19 very thin in thickness is disposed integrally with both the teeth 22 and the side walls 8L, 8S. Both the rack 4 and the tooth bottom part 19 in FIGS. 6 and 7 are identical or equivalent in their functions with that shown earlier in FIGS. 4 and 5, so that the previous description will be applicable.

Figure 8:
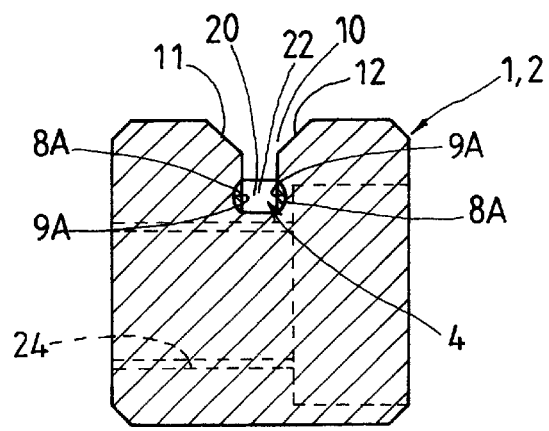
FIG. 8 is a cross section showing a third embodiment of any one of guide rail members in the finite linear motion guide unit of FIG. 1, the view being taken along an area corresponding to the plane lying on the line II—II of FIG. 1.
Figure 9:
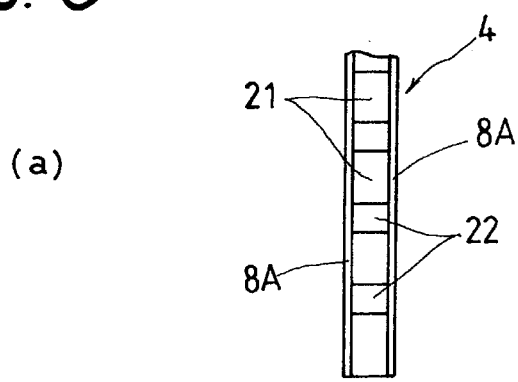
FIGS. 9(a), 9(b) and 9(c) illustrate a third embodiment of a rack to be laid in a gutter for relief cut in a raceway groove on the guide rail member of FIG. 8.
Figure 9:
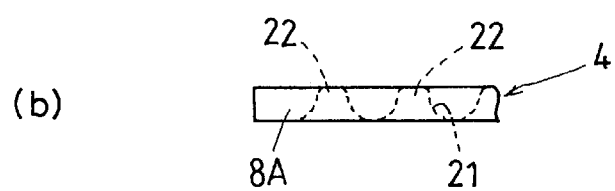
Figure 9:
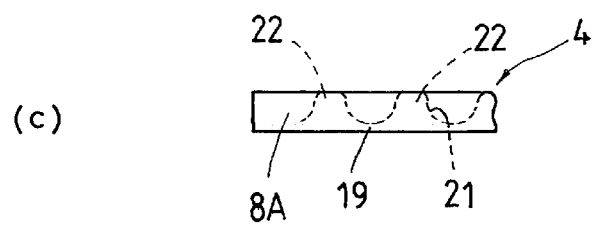

Next, the third embodiment of the rack 4 will be explained with reference to FIGS. 8 and 9. The gutter 20 for relief to fit therein the rack 4 according to this third embodiment, as illustrated in FIG. 8, is cut to have inside surfaces 9A that are made concaved to bulge the inside space sidewise outwardly in the depths of the gutter 20. Conforming to the inside surfaces 9A made concaved sidewise, the rack 4 has the side walls 8A each of which extends over the overall depth of the teeth 22, with getting convex or arced sidewise outwardly to rise at the intermediate area in depth. The side walls 8A in the rack 4 are joined together to the successive teeth 22 over their overall depth to keep securely the teeth 22 at the desired intervals. That is to say, the rack 4, as seen from FIGS. 8, 9(a) and (b), has the side walls 8A that extend over the overall depth of the teeth 22 and get thickened at the intermediate area in depth to rise conforming to the associated inside surfaces 9A of the gutter 20. The rack 4, as apparent from in FIGS. 9(a) and (b), is made up of only the successive teeth 22 connected integrally to the side walls 8S, 8L lying in sidewise opposition to each other across the teeth. The rack 4, as shown in FIG. 9(c), may be made in alternative construction where a tooth bottom part 19 very thin in thickness is disposed integrally with both the teeth 22 and the side walls 8L, 8S. Both the rack 4 and the tooth bottom part 19 in FIGS. 8 and 9 are identical or equivalent in their functions with that shown earlier in FIGS. 4 and 5, so that the previous description will be applicable.

Figure 10:
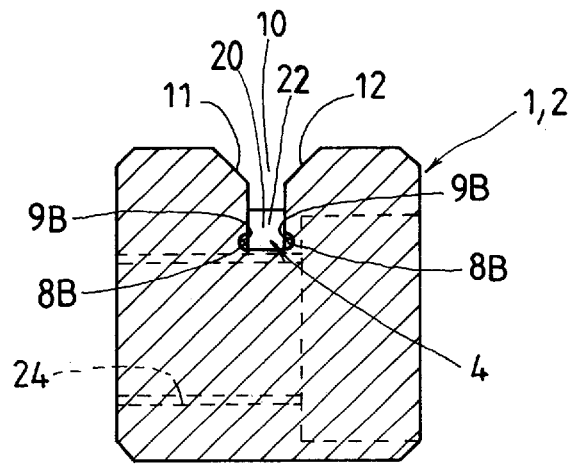
FIG. 10 is a cross section showing a fourth embodiment of any one of guide rail members in the finite linear motion guide unit of FIG. 1, the view being taken along an area corresponding to the plane lying on the line II—II of FIG. 1.
Figure 11:
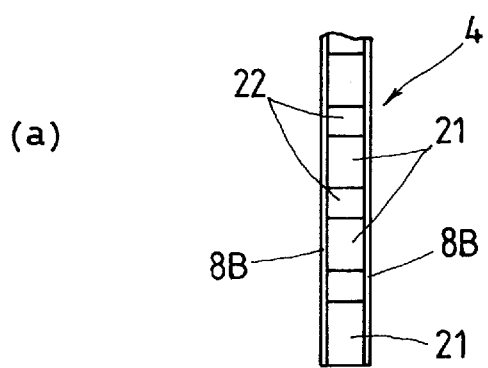
FIGS. 11(a), 11(b) and 11(c) illustrate a fourth embodiment of a rack to be laid in a gutter for relief cut in a raceway groove on the guide rail member of FIG. 10.
Figure 11:
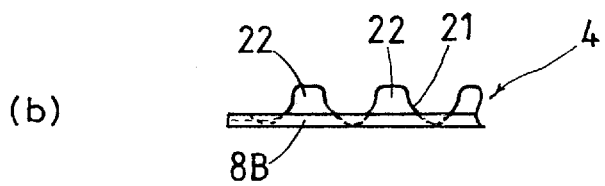
Figure 11:
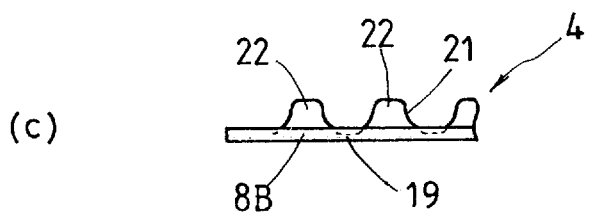

The fourth embodiment of the rack 4 will be explained with referring to FIGS. 10 and 11. The gutter 20 for relief in which the rack 4 of the fourth embodiment lies is cut to have inside surfaces 9B that are each made concaved or arced sidewise outwardly at only deep area next to the bottom of the gutter. Correspondingly, the rack 4 has side walls 8B that lie at only limited area lower in the depth of the teeth 22. Each of the side walls 8B gets convex or arced at the intermediate area in depth thereof to rise conforming to the associated inside surfaces 9B of the gutter 20. That is to say, the gutter 20 for relief cut in the guide rail member 1, 2, as shown in FIG. 10, gets widened sidewise at only deep area 9B next to the bottom of the gutter. The rack 4, as seen from FIGS. 10, 11(a) and (b), has the side walls 8B that made thickened at only limited area lower in the depth of the teeth 22. Each of the side walls 8B gets convex or arced at the intermediate area in depth thereof to rise conforming to the associated inside surfaces 9B of the gutter 20. The rack 4, as shown in FIG. 11(c), may be made in alternative construction where a tooth bottom part 19 very thin in thickness is disposed integrally with both the teeth 22 and the side walls 8B. Both the rack 4 and the tooth bottom part 19 in FIGS. 10 and 11 are identical or equivalent in their functions with that shown earlier in FIGS. 4 and 5, so that the previous description will be applicable.

Figure 12:
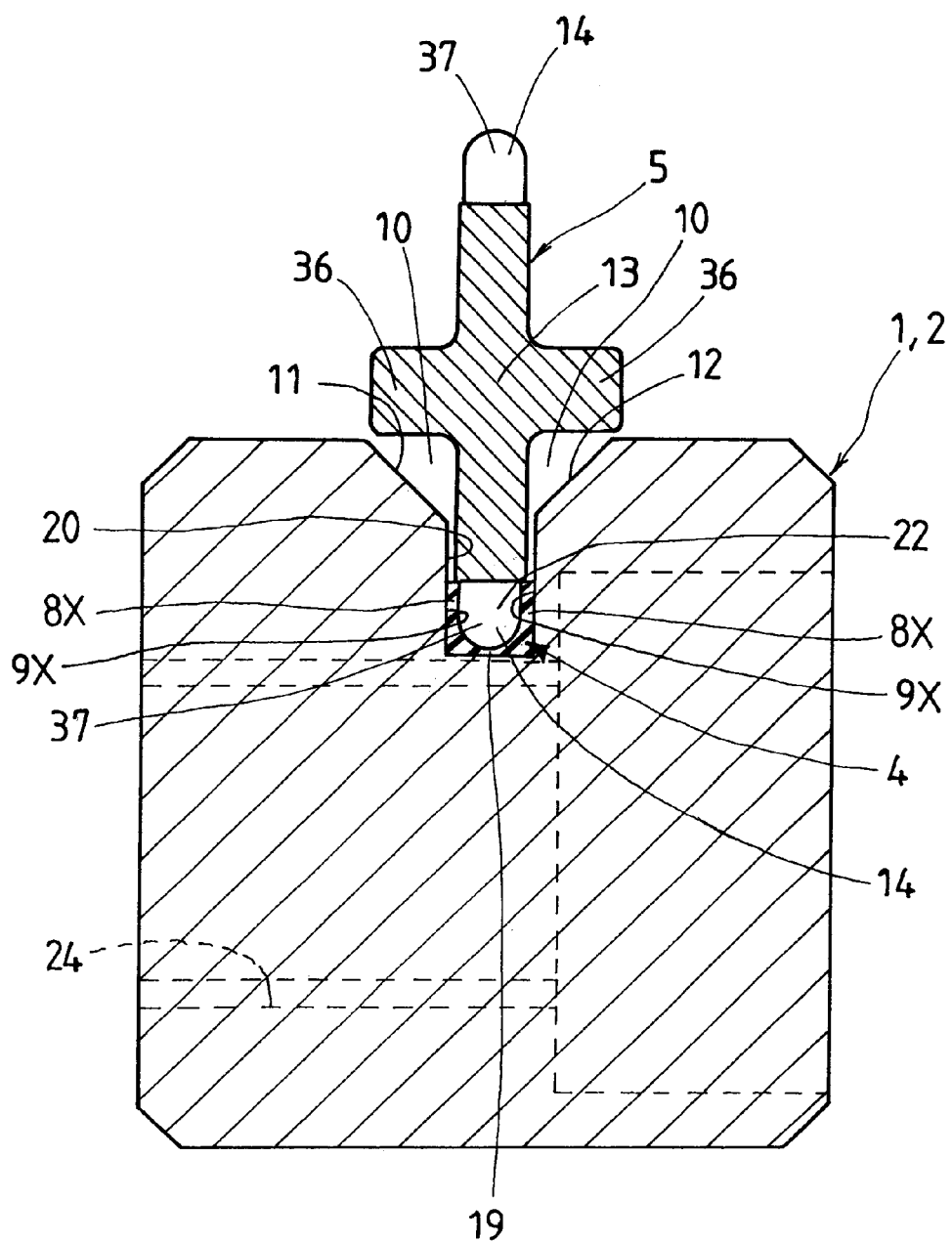
FIG. 12 is a traverse cross section of any one of the guide rail members of the finite linear motion guide unit of FIG. 1 to illustrate how the pinion is incorporated with the rack lying in the guide rail member, the view being taken along an area corresponding to the plane lying on the line I—I of that figure.
Figure 13:
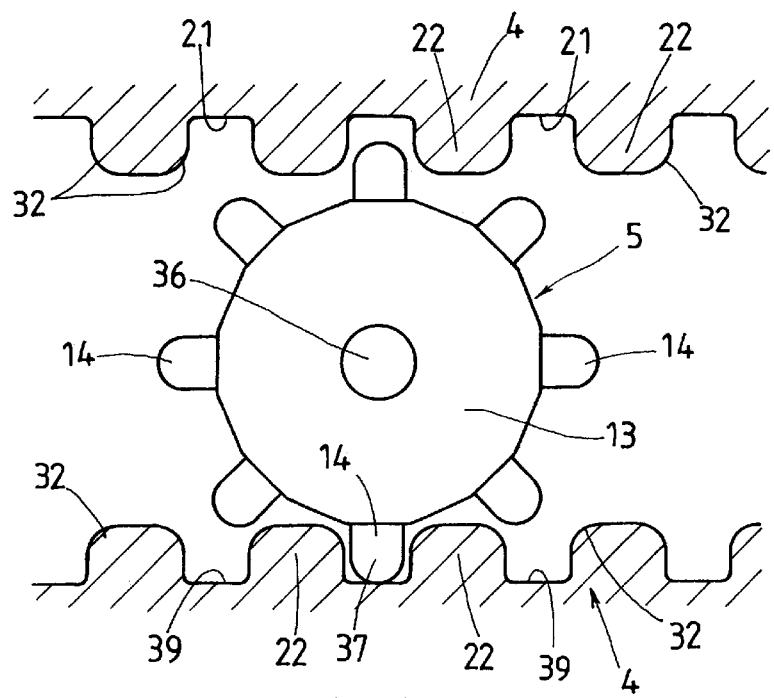
FIG. 13 is a schematic illustration explanatory of an example of mating condition of the pinion with the racks installed on the confronting guide rail members of the finite linear motion guide unit of FIG. 12.
Figure 14:
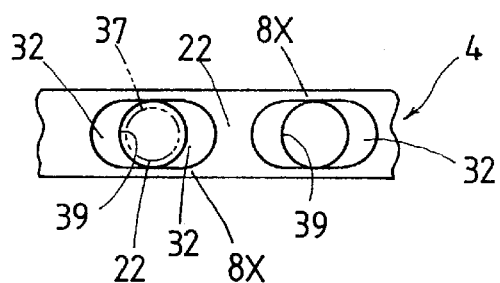
FIG. 14 is a fragmentary top plan view showing the rack in the finite linear motion guide unit of FIG. 13.
Figure 15:
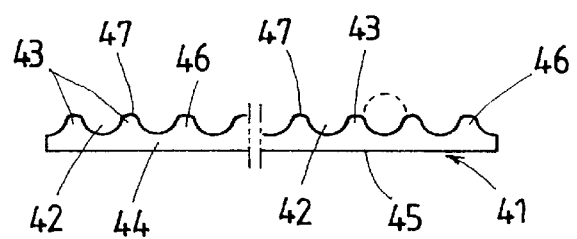
FIG. 15 is a side elevation showing a prior rack used in the conventional finite linear motion guide unit.

Although but a diversity of materials might be available well for the rack 4 used in the finite linear motion guide unit of the present invention, any resinous materials would be sufficient to provide tiny linear motion guide units. Moreover, the rack 4 can be made of any low-temperature fusible metals other than resinous materials. The rack 4 can be produced by machining the resinous material or low-temperature fusible metal that has been poured, for example as shown in FIGS. 12, 13 and 14, into the gutter 20 for relief cut in the guide rail member 1, 2. That is to say, the material for rack production including resinous material, low-temperature fusible metal, and so on is first poured in the gutter 20 cut in the guide rail member 1, 2, then subjected to machining operations such as drilling, end milling and the like to generate the rack 4 lying in the gutter 20 in the guide rail member 1, 2. According to the rack-cutting process stated just earlier, the rack material in the gutter 20 for relief remains in the form of the sidewise opposing side walls 8X of the desired thickness, which are kept in tight contact with the associated inside surfaces 9X of the gutter 20. At the same time the successive teeth 22 are generated, whether there is left the tooth bottom part between any two adjacent teeth 22 or not. As shown in the plan view of FIG. 14, a round slot 39 is made between any two adjacent teeth 22. Moreover, each tooth 22 of the rack 4 gets rounded at the tooth tip 32 thereof. The pinion 5 illustrated in FIGS. 12, 13 and 14, unlike the pinion known commonly, made in a unique construction having the teeth of round rods that get semicircle at their tooth tip.

Installation of the rack 4 of FIGS. 4 to 14 into the gutter 20 for relief is accomplished by any fit of the inside surfaces 8, 8L, 8S, 8A, 8B and 8X of the rack 4 in the gutter 20. But in some cases the rack 4 may be joined with any adhesives to the inside surfaces 9, 9L, 9S, 9A, 9B and 9X of the gutter 20. In any case, the side walls 8, 8L, 8S, 8A, 8B and 8X of the rack 4 is kept securely in close engagement with the inside surfaces 9, 9L, 9S, 9A, 9B and 9X of the gutter 20.

While the present invention has been disclosed in connection with the preferred embodiments thereof, it should be understood that other embodiments may be fall within the spirit and scope of the invention, as defined by the following claims.

What is claimed is:

1. A linear motion guide unit, comprising a pair of guide rail members that are arranged movable relatively to one another and have confronting raceway grooves on their lengthwise sides, one to each side, a cage retaining more than one rolling element allowed to run through in a raceway defined between the raceway grooves on the guide rail members, and means for keeping the cage against wandering;

wherein the means for keeping the cage against wandering is comprised of racks lying in gutters cut in the raceway grooves, one to each raceway groove, in opposition to one another, and a pinion having teeth mating with the opposing racks and installed in the cage for rotation; and wherein the rack is composed of successive teeth spaced apart from each other at preselected intervals to allow the teeth to mesh with the pinion, and side walls extending in longitudinal direction on sidewise opposite sides of the teeth, one to each side, to connect the successive teeth together with one another.

2. A linear motion guide unit constructed as defined in claim 1, wherein the side walls of the rack come in engagement with surfaces defining the gutter cut in the raceway groove of the guide rail member thereby to keep the rack within the gutter in the raceway groove of the guide rail member.

3. A linear motion guide unit constructed as defined in claim 2, wherein the surfaces defining the gutter cut in the guide rail member lean away one another with depth while the side walls of the rack are rendered thickened sidewise with depth in a way conforming to the surfaces in the gutter.

4. A linear motion guide unit constructed as defined in claim 1, wherein the gutter in the guide rail member is cut in a fashion getting extended sidewise in the depths of the gutter to form a rectangular shape in traverse cross section, with any one side of the surfaces being set back in sidewise distance either identical with or different from another side, and the side walls of the rack are made thickened in a way conforming to the surfaces in the gutter.

5. A linear motion guide unit constructed as defined in claim 1, wherein the gutter is cut in the guide rail member to have the surfaces made concaved to bulge sidewise outwardly in the depths of the gutter, and the rack has the side walls each of which extends over an overall depth of the teeth and gets convex sidewise outwardly so as to conform to the associated surface of the gutter.

6. A linear motion guide unit constructed as defined in claim 1, wherein the gutter cut in the guide rail member has the surfaces made concaved sidewise outwardly at only deep area next to a bottom of the gutter, and the rack has side walls that are made thick at only limited area lower in the depth of the teeth so as to conform to the associated surface of the gutter.

7. A linear motion guide unit constructed as defined in claim 1, wherein the rack consists of only the teeth and the side walls integral with the teeth.

8. A linear motion guide unit constructed as defined in claim 1, wherein the rack is made up of the teeth, the side walls and a tooth bottom part thin in thickness made integral with the teeth and the side walls.

9. A linear motion guide unit constructed as defined in claim 1, wherein the rack is made of either a resinous material or a low-temperature fusible metal, which is poured into the gutter of the guide rail member, then finished by removing partially material from the poured material with machining operations.

10. A linear motion guide unit constructed as defined in claim 1, wherein the rack is kept in the gutter in the guide rail member, with the side walls being either close fit or fastened with adhesives in the gutter.

11. A linear motion guide unit constructed as defined in claim 10, wherein the side walls of the rack are made in a way coming into engagement with the surfaces defining the gutter cut in the guide rail member.

12. A linear motion guide unit constructed as defined in claim 11, wherein the teeth of the rack are rounded at their tooth tips.

13. A linear motion guide unit constructed as defined in claim 1, wherein the rack is made with a round slot between any two adjacent teeth, and the pinion has the teeth of round rods that extend radially outwardly and get spherical at their tooth tips so as to mesh well with the round slot of the rack.

14. A linear motion guide unit constructed as defined in claim 13, wherein the teeth of the rack are rounded at their tooth tips.

15. A linear motion guide unit constructed as defined in claim 1, wherein the rack is suitable for the use in a tiny linear motion guide unit where bolt holes used to fasten an object including a table, bed, base, sliding pedestal, machine bed, and so on to the guide rail member have to be in as close as possible to the bottom of the gutter on which the rack is laid.

* * * * *